(12) United States Patent  
Hashi et al.

(10) Patent No.: US 6,674,588 B2
(45) Date of Patent: Jan. 6, 2004

(54) MAGNETIC TRANSFER APPARATUS

(75) Inventors: Hideyuki Hashi, Kadoma (JP); Taizou Hamada, Katano (JP); Nobuhide Matsuda, Hirakata (JP); Mitsuo Kobayashi, Kawasaki (JP)

(73) Assignees: Matsushita Electric Industrial Co., Ltd., Osaka (JP); Fuji Electric Co., Ltd., Kanagawa (JP)

(*) Notice: Subject to any disclaimer, the term of this patent is extended or adjusted under 35 U.S.C. 154(b) by 394 days.

(21) Appl. No.: 09/878,927

(22) Filed: Jun. 13, 2001

(65) Prior Publication Data

US 2002/0015245 A1 Feb. 7, 2002

(30) Foreign Application Priority Data

Jun. 13, 2000 (JP) ........................................ 2000-177509

(51) Int. Cl.[7] ................................................. G11B 5/86
(52) U.S. Cl. ......................................... 360/16; 360/137
(58) Field of Search ............................. 360/15, 13, 25, 360/74.4, 74.5, 97.02, 128, 130.3, 137, 16; 369/97.02, 72, 273

(56) References Cited

U.S. PATENT DOCUMENTS

| 3,922,438 | A | * | 11/1975 | Brown et al. | 428/327 |
| 4,047,230 | A | * | 9/1977 | Kume et al. | 360/17 |
| 4,211,580 | A | * | 7/1980 | Vowles | 134/9 |
| 4,572,867 | A | * | 2/1986 | Nakamura et al. | 428/328 |
| 5,092,011 | A | * | 3/1992 | Gommori et al. | 15/88.2 |
| 6,222,693 | B1 | * | 4/2001 | Aoki et al. | 360/53 |
| 6,570,724 | B1 | * | 5/2003 | Komatsu et al. | 360/17 |
| 6,602,301 | B1 | * | 8/2003 | Komatsu et al. | 360/17 |

* cited by examiner

Primary Examiner—David Hudspeth
Assistant Examiner—Fred F. Tzeng
(74) Attorney, Agent, or Firm—Venable LLP; Michael A. Sartori

(57) ABSTRACT

Surface of a transfer disk for performing magnetic transfer is repeatedly contacted or separated relative to a cleaning disk having a smaller hardness than the surface, thereby removing a foreign matter on the surface of the transfer disk.

5 Claims, 5 Drawing Sheets

MAGNETIC TRANSFER APPARATUS

This application is based on Patent Application No. 2000-177509 filed Jun. 13, 2000 in Japan, the content of which is incorporated hereinto by reference.

BACKGROUND OF THE INVENTION

1. Field of the Invention

The present invention relates to a magnetic transfer apparatus for transferring a recording data to a magnetic layer of a magnetic recording medium.

2. Description of the Related Art

A hard disk drive apparatus as an external storage for performing data read or data write to a magnetic recording medium is widely used in practical applications. The magnetic recording medium in the hard disk drive apparatus is, in general, written with the so-called servo information or the like corresponding to respective tracks for detecting the relative position of the recording/reproducing head to each track in the magnetic recording medium. The servo information or the like is written in the magnetic recording medium using a data write apparatus called a servo writer, under the hard disk drive apparatus disposed in a clean room or clean bench, in which the magnetic recording medium is incorporated.

As described above, in the clean room, in the case of using the data write apparatus to write the servo information or the like into the magnetic layer of the magnetic recording medium, at the time when the magnetic recording medium is carried in the clean room, as a measure for preventing the entry of a foreign matter adhered to the magnetic recording medium in the clean room, it is necessarily performed that cleanliness of the clean room is appropriately maintained while spraying clean air on the magnetic recording medium to remove the foreign matter.

However, it is not easy to remove a foreign matter once adhered for some reason to a part in the vicinity of the magnetic recording medium in the data write apparatus and exclude it from the clean room. Leaving the state adhered with such a foreign matter as it is will lead to staining of the magnetic recording medium to be recorded which is not appropriate.

In view of the above problems, it is an object of the present invention to provide a magnetic transfer apparatus for magnetically transferring a recording data to a magnetic layer of magnetic recording medium, which is capable of surely removing a foreign matter adhered to the data write apparatus without adding any complicated foreign matter removing apparatus.

SUMMARY OF THE INVENTION

In accordance with the present invention which attains the above object, there is provided a magnetic transfer apparatus characterized by comprising a magnetic transfer portion for contacting or separating a transfer disk provided thereon formed with a recording data to be magnetically transferred to a magnetic recording medium relative to a magnetic layer of the magnetic recording medium so that the recording data is magnetically transferred and for contacting or separating the transfer disk relative to a cleaning member for removing a foreign matter adhered to the transfer disk, a holding mechanism portion disposed in opposition to the magnetic transfer portion for selectively holding the magnetic recording medium or the cleaning member, and a controller for causing the magnetic transfer portion to make a movement of contacting or separating the transfer disk relative to the cleaning member when the cleaning member is held by the holding mechanism portion.

Further, the cleaning member may be a disk-formed member having a coating layer with a small hardness compared with the hardness of the transfer disk surface. The coating layer may be a polished nickel-phosphorus-plated layer.

The holding mechanism portion may be one which selectively holds a cleaning member confirmed to have predetermined cleanliness.

Further, the controller may be one which causes the magnetic transfer portion to perform the movement of contacting or separating the transfer disk relative to the cleaning member repeatedly a plurality of times.

As can be seen from the above description, with the magnetic transfer apparatus according to the present invention, when the cleaning member is held by the holding mechanism portion, the controller causes the magnetic transfer portion to make a movement of contacting or separating the transfer disk relative to the cleaning member so that a foreign matter adhered to the magnetic transfer portion as a data write apparatus can be surely removed, without adding any complicated foreign matter removing apparatus.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 2:
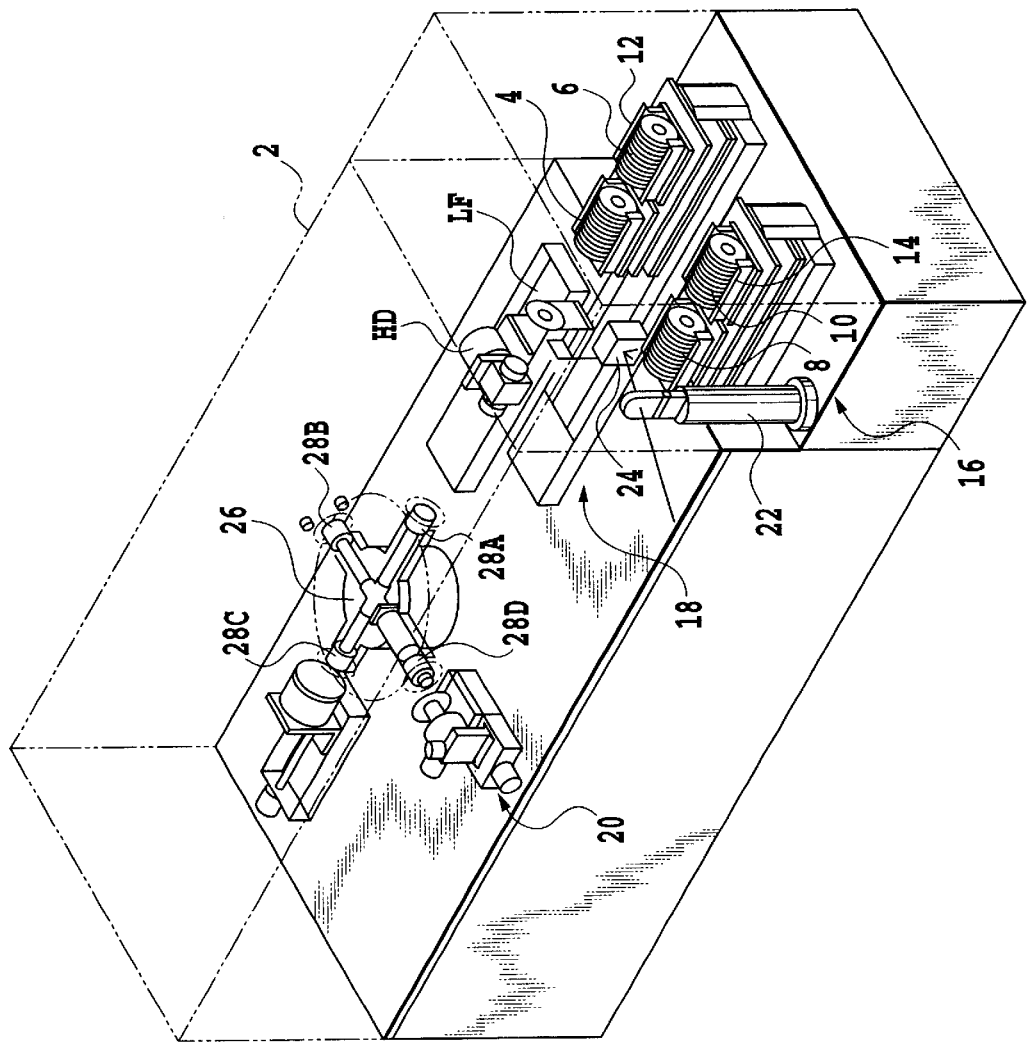
FIG. 2 is a perspective view schematically showing the entire construction of an example of magnetic transfer apparatus according to the present invention.

FIG. 2 shows the entire construction of an example of magnetic transfer apparatus according to the present invention.

In FIG. 2, the magnetic transfer apparatus is disposed in a clean room 2 maintained at predetermined cleanliness.

The magnetic transfer apparatus includes, for example, as main elements, a cassette case 12 having a plurality of cells each containing separately one of unrecorded magnetic disk 4 as the magnetic recording medium or magnetically transferred magnetic disk 6, a disk supply/discharge unit 16 disposed with a cassette case 14 having a plurality of cells each containing separately one of a cleaning disk 8 as the cleaning member or a used cleaning disk 10, a lift handling section 18 for successively holding each disk from the disk supply/discharge section 16 and transferring it to a transfer work stage 20 which will be described later, or transferring each disk from the transfer work stage 20 to the disk supply/discharge section 16, and a magnetic transfer stage 20 for performing magnetic transfer to each disk from the lift handling section 18 through a series of processes and cleaning operation to the transfer disk.

Figure 1:
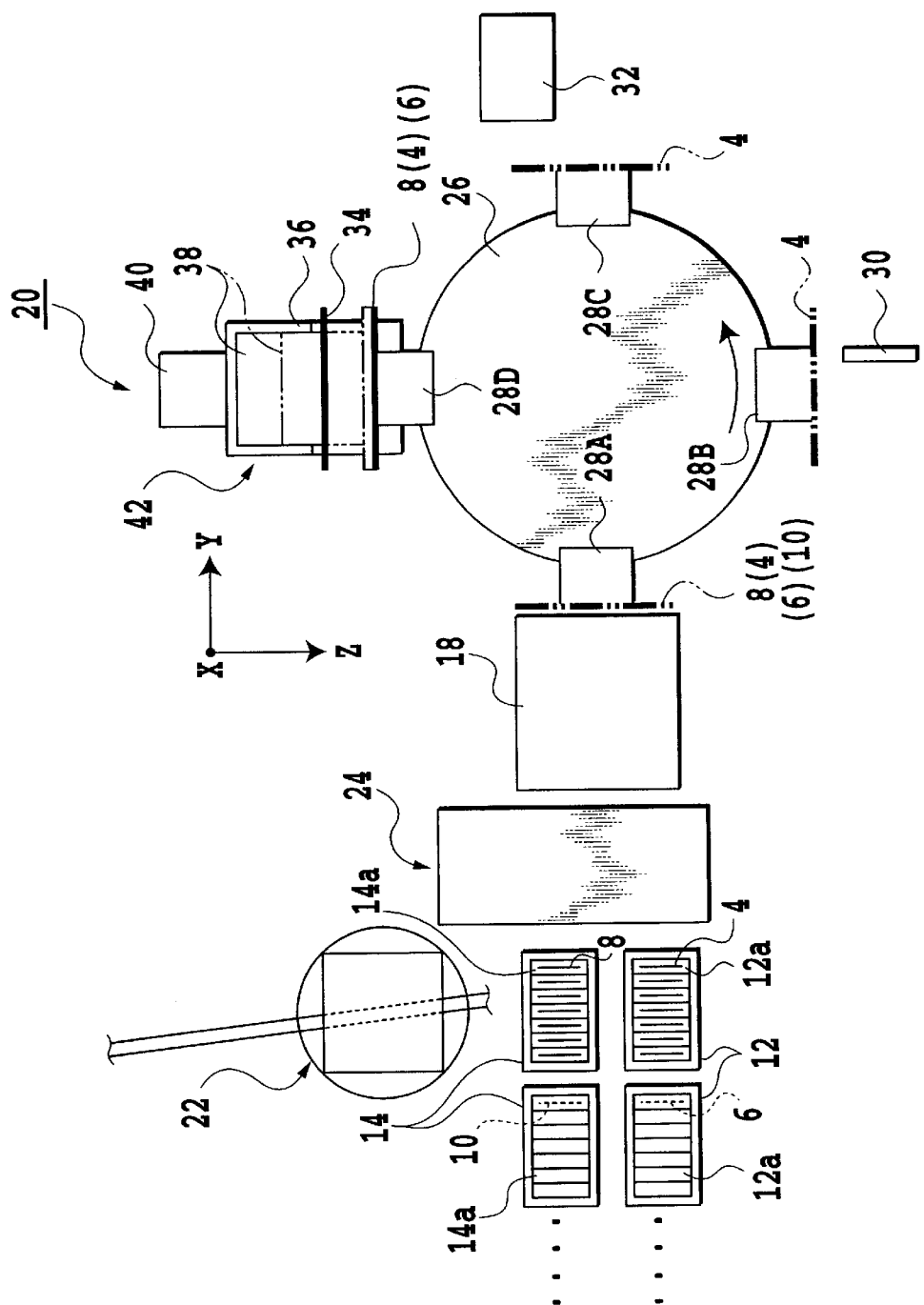
FIG. 1 is a block diagram schematically showing the construction of an example of magnetic transfer apparatus according to the present invention.

The cassette cases 12 and 14 in the disk supply/discharge section 16 are disposed, as shown in FIG. 1, in juxtaposition, each having a plurality of cells 12a and 14a. In each of the cells 12a of one cassette case 12 at the lift handling section 18 side in the cassette case 12, a single virgin magnetic disk 4 is contained. Further, in the cell 12a of the other cassette case 12, a single magnetically recorded magnetic disk 6 is contained. The magnetic disk 4 and the magnetic disk 6 are respectively contained so that the central axis line of the through hole thereof is disposed on a common straight line.

In each of the cells 14a of one cassette case 14 at the lift handling section 18 side in the cassette case 14, a single unused cleaning disk 8 is contained. Further, in the cell 14a of the other cassette case 14, a single used cleaning disk 10 is contained.

Figure 4:
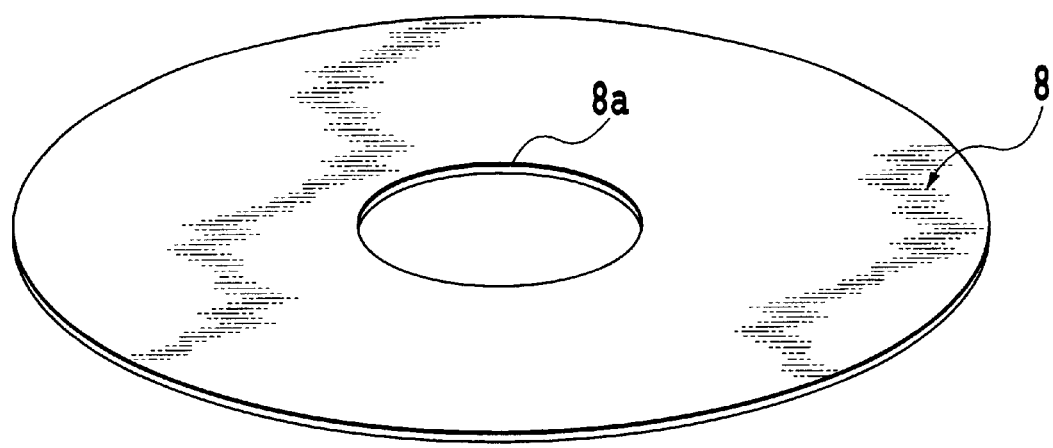
FIG. 4 is a perspective view showing outer appearance of a cleaning disk used in an example of magnetic transfer apparatus according to the present invention.

The cleaning disk 8 is, for example, as shown in FIG. 4, an annular plate-formed member having a through-hole 8a at the center thereof. The cleaning disk 8 is, for example, a plated base material made of an aluminum alloy material. After the plating treatment, the surface is polished to form a surface having a predetermined surface roughness. The plating treatment is, for example, NiP plating of a predetermined film thickness. Hardness of the surface portion contacting the transfer disk, which will be described later, in the cleaning disk 8 is smaller than the hardness of the transfer disk surface portion. The base material may be a plastic material or other alloy materials.

The magnetic disk 6 is an annular plate-formed member having the same diameter as the diameter of the cleaning disk 8. The magnetic disk 6 is, for example, a base material made of an aluminum alloy material having formed on the surface layer thereof a protective layer and a magnetic layer which is magnetically transferred with recording data.

The disk supply/discharge section 16 is provided with a carrier robot 22 adjacent to the cassette cases 12 and 14. The carrier robot 22 is, for example, a articulated robot, in which the single magnetic disk 4 and the magnetically recorded magnetic disk 6, or a single cleaning disk 8 and a used cleaning disk 10, are respectively held by its hand unit to carry them in both directions through an inspection stage 24 which will be described later between the respective cassette cases and the lift handling section 18.

The carrier robot 22, after being previously provided with teaching corresponding to a predetermined operation program, is operation controlled by a control unit which will be described later, whereby carrying the respective disks by its hand unit according to a predetermined operation path.

The inspection stage 24 is provided with an appearance inspection apparatus as a foreign matter detection apparatus having a known structure. An optical appearance inspection apparatus is, for example, a laser type appearance inspection apparatus which detects a foreign matter such as dust or the like adhered in more than a predetermined amount to the surface of the single magnetic disk 4 or cleaning disk 8, and transmits a determination output signal to the control unit which will be described later. The laser type appearance inspection apparatus comprises, for example, an inspection optical system for irradiating a laser beam to an surface to be inspected, and an observation optical system for determining the presence of a foreign matter of more than a predetermined amount by comparing the amount of light of reflection beam from the surface to be inspected with the amount of light of reference beam and transmitting a determination output signal to the control unit which will be described later.

The lift handling section 18 comprises, for example, a lift mechanism LF having a holding part on which a single disk held by the hand unit of the carrier robot 22 is placed, and a handling unit HD having a pair of chucking parts for grasping the disk by engaging the through-hole of the disk raised up to a predetermined acceptance position by the holding part of the lift mechanism.

The holding part of the lift mechanism LF has a V-formed groove engaged with a predetermined number of positions on the outer periphery of each disk. The disk placed on the holding part is held so that the extension direction of the central axis line of the through-hole is in a direction along the arrangement direction of disks in the cassette cases 12 and 14. The holding part of the lift mechanism LF is moved up and down between the predetermined acceptance position and a stand-by position at a predetermined timing by a drive mechanism (not shown).

The pair of chucking parts of the handling unit HD are disposed on a table moving forward or reverse relative to the lift mechanism LF. The pair of chucking parts are supported on the table 180° rotational movement in the forward or reverse direction at a predetermined position opposing the lift mechanism LF or an index mechanism which will be described later. The table of the handling unit HD is reciprocally moved between the vicinity of the lift mechanism LF and the vicinity of the index mechanism at a predetermined timing according to the acceptance of each disk.

Therefore, the pair of chucking parts of the handling unit HD, in the vicinity of the lift mechanism LF, perform an operation to provide each disk from the index mechanism to the lift mechanism LF by one chucking part, and receive a disk from the lift mechanism LF by the other chucking part. Further, the pair of chucking parts of the handling unit HD, in the vicinity of the index mechanism, perform an operation to receive each disk from the index mechanism by one chucking part, and provide each disk from the lift mechanism LF to the index mechanism by the other chucking part.

The magnetic transfer stage 20 comprises hand parts 28A, 28B, 28C, and 28D disposed at four positions at equal intervals of 90° along the peripheral direction on the same periphery of the rotational moveably supported rotary table portion 26 for selectively holding under suction or separating a single disk held.

The rotary table portion 26 is rotated intermittently by every 90° in the direction shown by the arrow in FIG. 1 by a driver (not shown).

On the periphery to be the outside opposing the hand part 28B, as shown in FIG. 1, a position sensor 30 is disposed for detecting the relative position of the held disk to the center position of the hand part 28B (gripping part) of the rotation center position of the held disk to issue a detecting signal. The position sensor 30 is, for example, to detect the two-dimensional relative position in the cartesian coordinate system by a coordinate axis in the vertical direction to the paper surface and a coordinate axis perpendicular to the above vertical axis in the plane of the held disk.

On the periphery to be the outside opposing the hand part 28C, a demagnetization unit 32 is disposed which has a magnet for demagnetize residual magnetism of each disk held under suction by the hand part 28C.

On the periphery to be the outside opposing the hand part 28D, a magnetic transfer unit 42 is provided which has a transfer disk 34 for performing magnetic transfer to the magnetic disk 4 held by the hand part 28D.

The magnetic transfer unit 42, as shown in FIG. 1, comprises a slide table portion 38 for holding the transfer disk 34 and a guide base 36 for guiding the entire slide table portion 38 forward and reverse in the direction shown by arrow Z.

The slide table portion 38 is supported to be movable in the direction shown by arrow X in FIG. 1 (nearly perpendicular to the paper surface) or the direction shown by arrow Y, and linked to the output side of a drive motor (not shown).

When the drive motor is in operation, the slide table portion 38 moves the transfer disk 34 in the direction shown by arrow X or arrow Y in FIG. 1.

The guide base 36 is provided with a drive motor 40 for moving forward and reverse the entire slide table portion 38 in the direction shown by arrow Z. The output side of the drive motor 40 is linked to the slide table portion 38, for example, through a ball screw.

Figure 3:
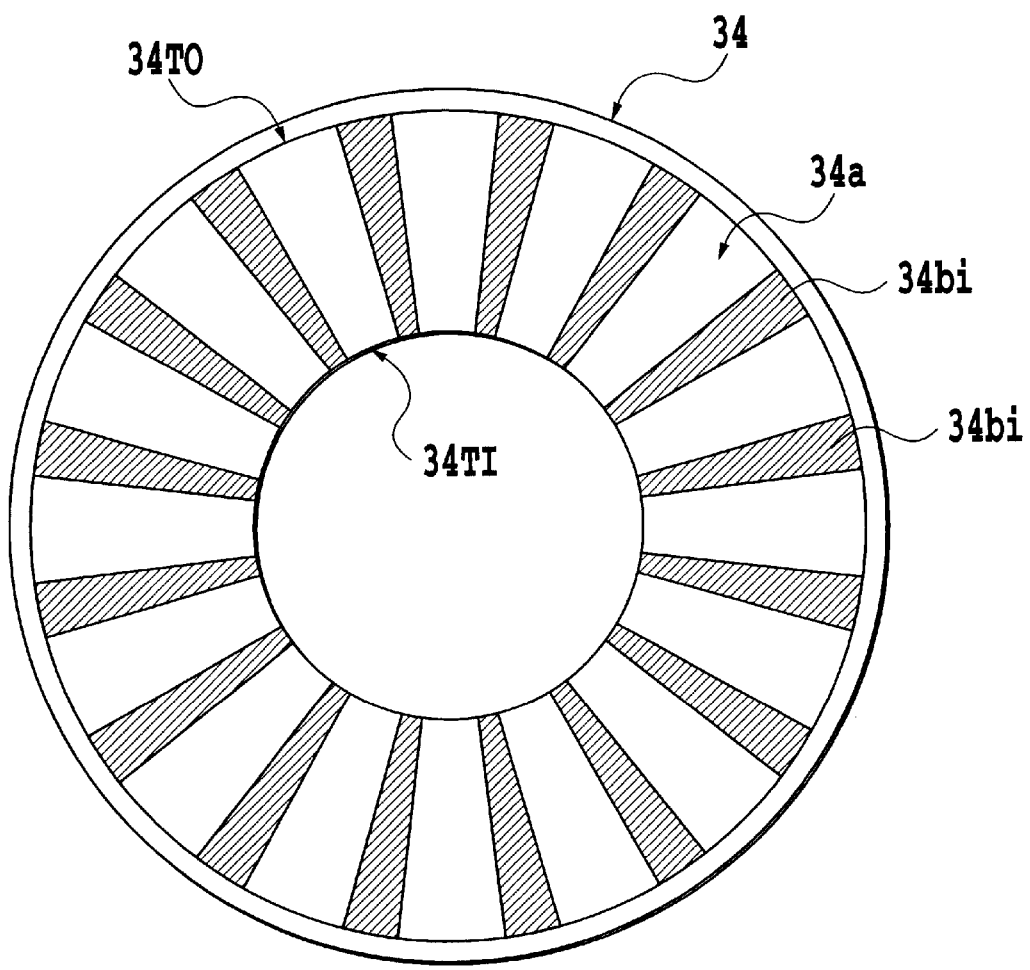
FIG. 3 is a plane view showing each transfer layer of a transfer disk used in an example of magnetic transfer apparatus according to the present invention.

On the end surface of the transfer disk 34 opposing the magnetic disk 4 to be magnetically transferred, for example, as shown in FIG. 3, a transfer layer 34bi (i=1 to n, n is an integer) embedded in a plurality of grooves provided radially corresponding to the recording data area of the magnetic disk 4 is formed in the surface layer 34a made of silicon. The transfer layer 34bi is formed, for example, of cobalt. The respective grooves and transfer layers 34bi are formed, for example, utilizing etching. The transfer layer 34bi is formed in the range from the track position 34TI near the predetermined center side along the radial direction to the track position 34TO near the outside. The transfer layer 34bi is formed with a recording data including servo information or the like to be transferred.

In FIG. 1, the moving amount of the slide table portion 38 in the direction shown by arrow X and arrow Y is controlled by the control unit which will be described later so that the center position of the transfer disk 34 is in line with the center position of the magnetic disk 4 based on the detection output signal from the above-described position sensor 30.

Further, the moving amount of the slide table portion 38 in the direction shown by arrow Z is controlled by the control unit according to a preset value so that as shown by the chain double-dashed line in FIG. 1 the transfer layer 34bi of the transfer disk 34 is closely contacted with the magnetic layer of the magnetic disk 4 or the surface of the cleaning disk 8. Further, the slide table portion 38 is controlled so that it returns from the state where the transfer layer 34bi of the transfer disk 34 is closely contacted, separates from the magnetic layer of the magnetic disk 4 or the cleaning disk 8 to the initial position.

The principle of magnetic transfer of recording data to the magnetic layer of the magnetic disk 4 by the transfer disk 34, transfer method thereof, and operation details thereof are the same as described in Japanese Patent Application Laid-open No. 40544/1998.

Figure 5:
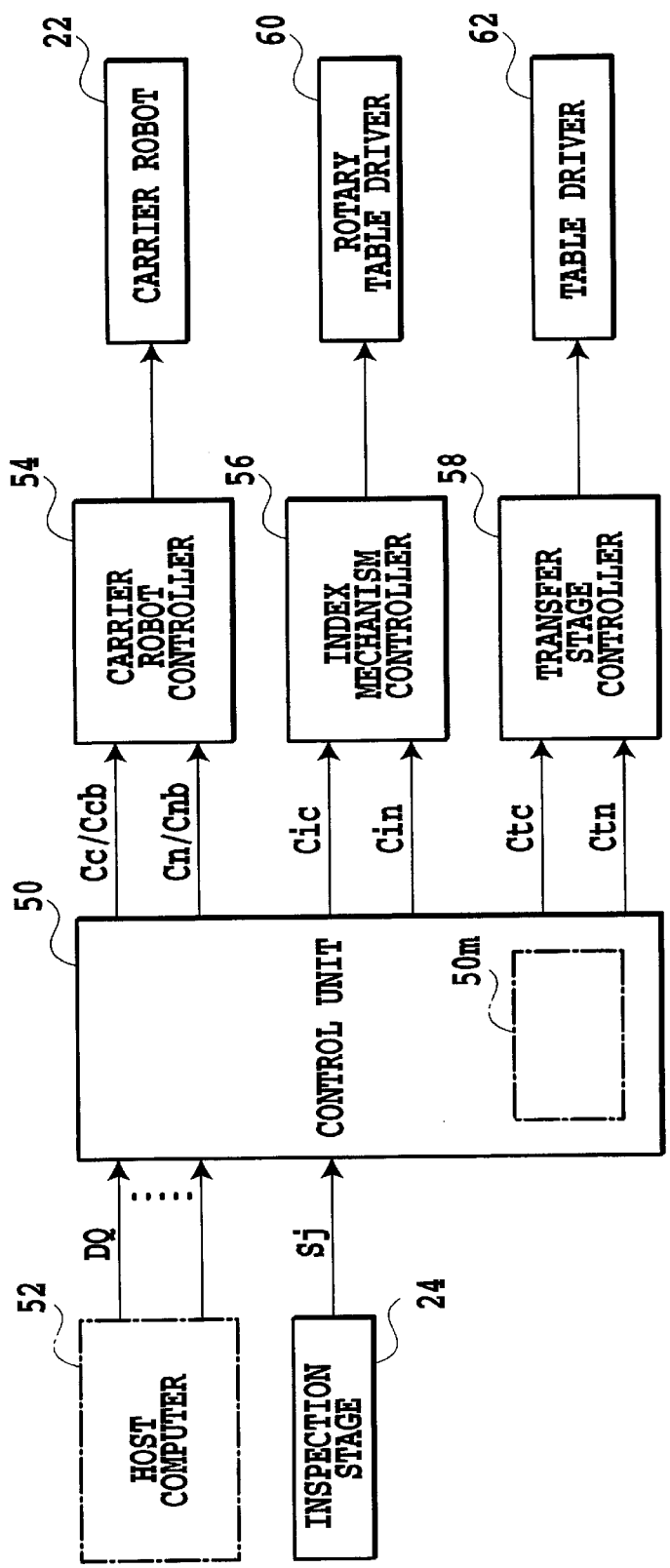
FIG. 5 is a block diagram showing the construction of a control unit provided in an example of magnetic transfer apparatus according to the present invention.

Further, an example of magnetic transfer apparatus according to the present invention, as shown in FIG. 5, is provided with a carrier robot 22, the slide table portion 38, and a control unit 50 for controlling operation of a rotary table portion 26.

The control unit 50 is supplied with control data group DQ including data representing the type and number of magnetic disks to be magnetically transferred from a host computer 52 for performing production control and used number of cleaning disks, deviation data representing position deviation according to the detection output signal from the position sensor 30, mode data representing magnetic transfer mode for performing magnetic transfer, or cleaning mode for cleaning the transfer disk 34, data representing operation start or end, and the like. Further, the control unit 50 is supplied with a judgment signal Sj representing that the magnetic disk 4 from the inspection stage 24 or the cleaning disk 8 is a conforming item.

The control unit 50 has a memory 50m for storing the deviation data from the above-described host computer 52, data represented by the judgment signal Sj corresponding to each disk, and operation program data and the like.

The control unit 50, when the magnetic transfer mode is determined based on the control data group DQ, forms a control signal Cn to cause the carrier robot 22 to take out the magnetic disk 4 in the cassette case 12 and carry the magnetic disk to the inspection stage 24, and supplies the signal to the carrier robot controller 54. The carrier robot controller 54 supplies a control signal to cause the carrier robot 22 to perform the work according to a predetermined operation program on the basis of the control signal Cn. This causes the carrier robot 22 to take a single magnetic disk 4 and feeds it to the inspection stage 24.

The inspection stage 24 performs a predetermined inspection on the magnetic disk 4. When the magnetic disk 4 is a comforming item, the inspection stage 24 transmits the judgment signal Sj. On the other hand, when the magnetic disk 4 is defective, the inspection stage 24 requests the host computer 50 to feed the next magnetic disk 4.

The control unit 50, according to the data based on the judgment signal Sj, forms the control signal Cn and supplies it to the carrier robot controller 54 so that the carrier robot 22 is caused to move the magnetic disk 4 as comforming item from the inspection stage 24 to the lift handling section 18.

This carries the magnetic disk 4 by the lift handling section 18 to the position opposing the hand part 28A, and then the magnetic disk 4 is held by the hand part 28A.

Next, the control unit 50 forms a control signal Cin and supplies it to the index mechanism controller 56 so that the rotary table portion 26 is rotated intermittently by every 90° in the direction shown by the arrow. The index mechanism controller 56 rotates the rotary table portion 26 intermittently at a predetermined timing according to a predetermined operation program, after passing through the position opposing the position sensor 30, demagnetization unit 32, and the position opposing the slide table portion 38, forms a control signal to return to the initial position, and supplies the signal to the rotary table driver 60. When the hand part 28A holding the magnetic disk 4 reaches the position opposing the position sensor 30, by feeding the subsequently supplied magnetic disk 4 is supplied to be held by the hand part 28D2, as a result, up to four subsequently supplied magnetic disks 4 are held by the hand parts 28D, 28C, and 28B, respectively.

At this moment, the control unit 50, when the magnetic disk 4 held by the hand 28A reaches the position opposing the slide table portion 38 and stops at the position, causes position adjustment to perform so that the center position of he transfer disk 34 and the center position of the magnetic disk 4 are in line with each other, forms a control signal Ctn and supplies it to the transfer stage controller 58 so as to cause the drive motor 40 to closely contact the transfer disk 34 with the magnetic disk 4. The transfer stage controller 58 forms a control signal on the basis of the control signal Ctn and supplies it to the table driver 62 including the drive motor 40. This provides a predetermined magnetically transferred magnetic disk 6. The resulting magnetic disk 6 is moved to the position opposing the lift handling section 18 by further rotating the hand 28A.

Next, the control unit 50 causes the carrier robot 22 to operate by forming a control signal Cnb and supply it to the carrier robot controller 54, so that the magnetic disk 6 held by the lift handling section 18 from the hand portion 28A is contained in the cassette case 12 by carrier robot 22. This causes the carrier robot 22 to contain the magnetic disk 6 in the cell 12a of the cassette case 12. The magnetic disk 6 obtained thereafter is successively contained similarly by the carrier robot 22 in the cell 12a of the cassette case 12.

On the other hand, the control unit 50, before or immediately after completion of the above magnetic transfer mode, when the cleaning mode is judged according to the control data group DQ, forms a control signal Cc and supplies it to the carrier robot controller 54, so that the control unit 50 causes the carrier robot 22 to take out the cleaning disk 8 in the cassette case 14 to be fed to the inspection stage 24. The carrier robot controller 54 supplies a control signal to cause the carrier robot 22 to perform the work according to a predetermined operation program based on the control signal Cc. This causes the carrier robot 22 to take out a single cleaning disk 8 and feed it to the inspection stage 24.

The inspection stage 24 performs a predetermined inspection on the cleaning disk 8. When the disk 8 is a comforming item, the inspection stage 24 transmits the judgment signal Sj. On the other hand, when the disk 8 is defective, the inspection stage 24 requests the host computer 50 to feed the next cleaning disk 4.

The control unit 50 forms the control signal Cc and supplies it to the carrier robot controller 54 so that according to the data based on the judgment signal Sj from the inspection stage 24, the cleaning disk 8 as a conforming item is fed from the inspection stage 24 to the lift handling section 18. By this operation, the cleaning disk 8 is fed by the lift handling section 18 to the position opposing the hand 28A, and then held under suction by the hand 28A.

Next, the control unit 50 forms a control signal Cic and supplies it to the index mechanism controller 56 so that the rotary table portion 26 is rotated by a predetermined angle, for example, about 270°, in the direction shown by the arrow at a predetermined timing. The index mechanism controller 56 forms a control signal and supplies it to the rotary table driver 60 so that the rotary table portion 26 is rotated according to a predetermined operation program, after passing through the opposing the position sensor 30 and the demagnetization unit 32, and then stopped at the position opposing the slide table portion 38.

In this case, the control unit 50, when the cleaning disk 8 held by the hand portion 28A reaches the position opposing the slide table portion 38 and stops at that position, forms the control signal Ctc and supplies it to the transfer stage controller 58 so that the control unit 50 causes the drive motor 40 to repeat contact and separation of the transfer disk 34 a plurality of times relative to the cleaning disk 8. The transfer stage controller 58 forms a control signal according to the control signal Ctc and supplies it to the table driver 62 including the drive motor 40. By this operation, a foreign matter such as burr or the like formed on the boundary part of the transfer layer 34a with other part in the transfer disk 34 is held by biting into the surface layer of the cleaning disk 8 thereby being removed. Such removal is because the hardness of the surface layer of the cleaning disk 8 is small compared to the hardness of the transfer layer 34a of the transfer disk 34 and other parts, and the surface roughness of the surface layer of the cleaning disk 8 is smooth and finished to high precision as compared with the surface roughness of the transfer layer 34a of the transfer disk 34 and other parts.

The used cleaning disk 10 is moved to the position opposing the lift handing section 18 by further rotating the hand portion 28A.

Next, the control unit 50 forms a control signal Ccb to be supplied to the carrier robot controller 64 to cause the carrier robot 22 to operate so that the cleaning disk 10 held by the lift handling section 18 from the hand portion 28A is contained in the cassette case 14. By this operation, the cleaning disk 10 is contained in the cell 14a of the cassette case 14 by the carrier robot 22. Thereafter, the used cleaning disk 10 is similarly contained successively in the cell 14a of the cassette case 14.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic transfer apparatus comprising:
   a magnetic transfer portion for contacting or separating a transfer disk provided thereon formed with a recording data to be magnetically transferred to a magnetic recording medium relative to a magnetic layer of said magnetic recording medium so that said recording data is magnetically transferred and for contacting or separating said transfer disk relative to a cleaning member for removing a foreign matter adhered to said transfer disk;
   a holding mechanism portion disposed in opposition to said magnetic transfer portion for selectively holding said magnetic recording medium or said cleaning member; and
   a controller for causing said magnetic transfer portion to make a movement of contacting or separating said transfer disk relative to said cleaning member when said cleaning member is held by said holding mechanism portion.

2. The magnetic transfer apparatus as claimed in claim 1, wherein said cleaning member is a disk-formed member having a coating layer with a smaller hardness than surface hardness of said transfer disk.

3. The magnetic transfer apparatus as claimed in claim 2, wherein said coating layer is a polished nickel-phosphorus-plated layer.

4. The magnetic transfer apparatus as claimed in claim 1, wherein said holding mechanism portion selectively holds said cleaning member confirmed to have predetermined cleanliness.

5. The magnetic transfer apparatus as claimed in claim 1, wherein said controller causes said magnetic transfer portion to perform movement of contacting or separating said transfer disk relative to said cleaning member repeatedly a plurality of times.

* * * * *